United States Patent [19]
Nakagomi et al.

[11] Patent Number: 5,467,849
[45] Date of Patent: Nov. 21, 1995

[54] BRAKE BAND

[75] Inventors: Hirofumi Nakagomi; Yoshihisa Harada; Shigeki Umezawa, all of Shizuoka, Japan

[73] Assignee: NSK-Warner K.K., Tokyo, Japan

[21] Appl. No.: 231,679

[22] Filed: Apr. 25, 1994

[30] Foreign Application Priority Data

Apr. 30, 1993 [JP] Japan .................. 5-030971 U

[51] Int. Cl.$^6$ ............................................. F16D 53/00
[52] U.S. Cl. ............................ 188/77 W; 188/77 R; 192/80
[58] Field of Search ................. 188/77 R, 77 W, 188/259, 261, 264 B, 264 E; 192/80, 83, 107 T, 109 B

[56] References Cited

U.S. PATENT DOCUMENTS

| | | | |
|---|---|---|---|
| 1,286,171 | 11/1918 | Cory | 188/259 |
| 5,135,082 | 8/1992 | Umezawa et al. | 188/77 W |
| 5,238,091 | 8/1993 | Nakagawa et al. | 188/77 W |

FOREIGN PATENT DOCUMENTS 515627  4/1993  Japan .

*Primary Examiner*—Robert J. Oberleitner
*Assistant Examiner*—Chris Schwartz
*Attorney, Agent, or Firm*—Evenson, McKeown, Edwards & Lenahan

[57] ABSTRACT

A brake band suitable for use in a vehicle transmission is described. The brake band is composed of a band portion, such as a metal strap, and a brake lining bonded at an outer peripheral surface thereof on an inner peripheral surface of the band portion and has an apply side end and an anchor side end located opposite to each other relative to a circumferential length of the brake band. The brake lining is provided with oil-dependent, friction surface cooling grooves having bottom walls, respectively. Each cooling groove is provided with a discharging aperture extending through the bottom wall of the corresponding cooling groove to the outer peripheral surface of the brake lining. Adjacent to the anchor side end of the brake band, the brake lining is also provided with an oil film formation promoter, for example, in the form of one or more recesses not extending to the outer peripheral surface of the brake lining. As an alternative, the oil film formation promoter can also be provided by leaving the brake lining as is, that is, without forming any recess, groove, aperture or the like in the vicinity of the anchor side end.

14 Claims, 6 Drawing Sheets

BRAKE BAND

BACKGROUND OF THE INVENTION

1) Field of the Invention

This invention relates to a brake band suitable for use in a transmission or like of a vehicle, for example, an automobile, an agricultural machinery or a construction machinery.

2) Description of the Related Art

In an automatic transmission, multiplate clutches, brake bands and the like are used to effect speed changes by causing an input element such as a gear train to engage or releasing the same. Of these, brake bands are widely used for their preferred characteristic that, even if the same application is applied to a drum, their braking force differs depending on the braking direction of the drum and smooth up-shifting is feasible.

A fundamental construction of a brake band is illustrated in FIG. 15. The brake band, which is generally indicated at numeral 7, is formed of a curved strap 3 made of a thin steel plate. Brackets 4,4 are connected to opposite end portions of the strap 3, respectively. A porous thin friction material (lining) 2 is bonded with an adhesive on an inner peripheral surface of the strap 3.

Of these brackets, the bracket 4 is an apply-side bracket on which hydraulic pressure for actuating the brake acts, whereas the bracket 4' is a anchor-side bracket.

To improve the oil discharge characteristic between the drum and the lining in the course of a binding operation of the brake band in such a band brake, the lining 2 may be provided with an oil groove 5, which may in turn be provided with oil discharging apertures 6.

The action of the brake band will next be described in short with reference to FIG. 16. The brake band encircles a drum 1. When it is desired to actuate the brake, hydraulic pressure is applied as indicated by arrow P to the bracket 4 on an apply side to bind the brake band. Designated at 4' is the anchor-side bracket on an opposite end, that is, on a support side.

When the drum is rotating in a direction indicated by arrow L, the band brake is used in a so-called "leading state". When the drum is rotating in an opposite direction, the band brake is then used in a so-called "trailing state".

Unless the oil groove 5 and the oil discharging apertures 6 are arranged appropriately, the discharging function of the brake band for an oil film existing between the drum and the lining in the course of binding of the brake band is low and the brake band exhibits a low friction characteristic especially during an initial period of binding in which the pressing force is low. This leads to a sudden increase in binding force at a final stage of binding, resulting in an increased shift shock.

It was hence proposed to provide a brake lining with such oil grooves and oil discharging apertures as shown in FIGS. 8 and 9. In these drawings, the oil grooves and the oil discharging apertures are indicated by numerals 8 and 9, respectively. Designated at numeral 8' are oil grooves communicating to an exterior at opposite ends of the brake linings.

In each of FIGS. 8 and 9, the oil grooves and oil discharging apertures are arranged symmetrically relative to a central line which as viewed in the drawing, vertically extends at a right angle with respect to a longitudinal central axis of the brake lining, in other words, on an apply side and an anchor side.

In the lining 2a shown in FIG. 8, the oil grooves 8, which are each provided with the oil discharging aperture 9, are arranged in three rows. In the lining 2b illustrated in FIG. 9, on the other hand, the oil grooves 8, each of which is also provided with the oil discharging aperture 9 are arranged in a single row along the longitudinal central axis.

Various potential inconveniences may however arise if oil grooves and oil discharging apertures are arranged, as shown in FIGS. 8 and 9, over an entire area of a brake lining from its apply side to its anchor side and symmetrically relative to a central line extending at a right angle with respect to a longitudinal central axis of the brake lining.

In the case of the brake lining 2a depicted in FIG. 8, the discharge of oil is excessive so that the starting friction torque is large and the shifting performance is deteriorated. In the case of the brake lining 2b illustrated in FIG. 9, the discharge of oil is insufficient so that the starting friction torque is small and the binding force suddenly increases at a final stage of binding. The brake linings 2a, 2b are unavoidably accompanied by these drawbacks.

To overcome such drawbacks, it has therefore been proposed to make the total area of oil discharging means, which are provided in the portion of a brake lining which is near an apply side end of a brake band, greater than that of oil discharging means in the portion of the brake lining which is on an anchor side of the brake band as shown in U.S. Pat. No. 5,135,082 which has been assigned to the same assignee as the present invention and is hereby incorporated herein by reference.

When such a brake band is used, its torque curve becomes flat as shown in FIG. 12 so that shift shocks can be reduced. When a drum is rotating in a leading direction, however, a surface pressure applied on the anchor side end is generally at least twice as much as a surface pressure applied on the apply side. More heat is therefore produced on the anchor side and especially when the brake band is used at elevated temperatures, in other words, in the state of low oil viscosity, thereby making it impossible to maintain an oil film on the anchor side. The brake lining is therefore caused to burn out little by little from its surface, whereby a greater torque change takes place with time. In the middle of its use, this torque change can be illustrated as shown in FIG. 13. At the end of its use, it can be depicted as shown in FIG. 14. As is understood from the changes in torque curve shown in FIGS. 13 and 14, the torque at the beginning of each engagement and hence, the shift shock increase as the time of use becomes longer.

SUMMARY OF THE INVENTION

With a view toward eliminating the drawbacks described above, the present invention has as a primary object the provision of a brake band having a substantially uniform time-versus-torque relationship as its characteristic so that improved shifting performance can be achieved.

In one aspect of the present invention, there is provided a brake band suitable for use in a vehicle transmission, said brake band comprising a band portion and a brake lining bonded at an outer peripheral surface thereof on an inner peripheral surface of the band portion and having an apply side end and an anchor side end located opposite to each other relative to a circumferential length of the brake band. The brake lining is provided with oil-dependent, friction surface cooling means and oil discharging means and, adjacent to the anchor side end of the brake band, with means for promoting the formation of an oil film.

Preferably, at least one oil recess without any oil discharging means is formed, as an oil reservoir for promoting the formation of an oil film, in the brake lining in the vicinity of the anchor side end. The oil recess is, for example, in the form of a groove or aperture not extending to the outer peripheral surface of the brake lining. As an alternative, the brake lining may be free of any recess in the vicinity of the anchor side end so that the formation of an oil film is facilitated there.

The friction surface cooling means may desirably comprise oil grooves formed in the brake lining without extending to the outer peripheral surface, whereby the oil grooves have bottom walls, respectively, the oil discharging means comprises oil discharging apertures formed through the bottom walls of the oil grooves, respectively, and the total cross-sectional area of the oil grooves per unit area of the brake lining decreases from the apply side end toward the anchor side end. Desirably, the oil grooves may have substantially the same cross-sectional area and the number of the oil grooves per unit area may become smaller from the apply side end toward the anchor side end.

Desirably, the brake lining may have at least one groove extending to the outer peripheral surface of the brake lining and communicating to an exterior through the apply side end.

The brake band according to the present invention has the characteristic that the time-versus-torque relationship remains substantially uniform so that the shifting performance can be improved.

Further, the brake lining is provided, at an area other than the area in the vicinity of the anchor side end, with means having oil discharging function as in the prior art. Frictional heat which is produced upon binding can be promptly taken away with oil, whereby the brake lining can be prevented from seizure.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE PREFERRED EMBODIMENTS

FIGS. 1 to 7 show, in development, the linings of the brake bands according to the first to seventh embodiments of this invention so that the arrangements of oil grooves, oil discharging apertures and oil reservoirs are shown, respectively. In all the drawings, the left-hand end and the right-hand end are an apply side end AP and an anchor side end AC, respectively.

A brake band generally has one or more grooves and oil discharging apertures so that the friction surface can be cooled by a lubricating oil upon binding. As described above, the amount of an oil film during non-binding time is greater on the apply side than on the anchor side and upon braking, the surface pressure on the apply side is ½ or less of that on the anchor side.

In view of the foregoing, the present invention not only reduces the amount of oil to be discharged but also provides one or more oil reservoir in the vicinity of the anchor side end while minimizing a reduction in the number (i.e., area) of grooves and discharging apertures as friction surface cooling means.

Figure 1:
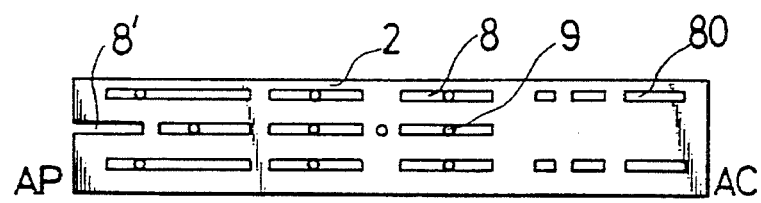
FIG. 1 is a development of a brake lining of a brake band according to a first embodiment of this invention.

In the first embodiment shown in FIG. 1, the right-hand, i.e., anchor side end of the lining 2 is not provided with any oil groove communicating to an exterior, namely, with anything similar to a groove 8' on the apply side. Grooves 80 not provided with any oil discharging aperture are formed in the vicinity of the anchor side end to serve as oil reservoirs. At the left-hand, i.e., apply side end, there is the oil groove 8' communicating to the exterior through the apply side end. All the remaining oil grooves 8 are provided with an oil discharging aperture 9.

Figure 2:
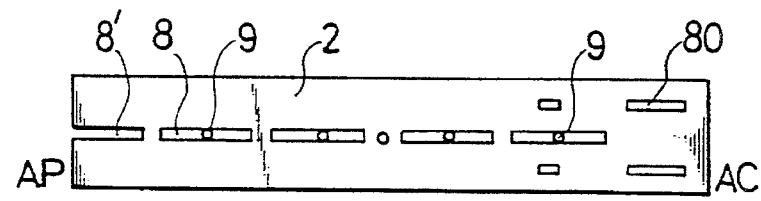
FIG. 2 is a development of a brake lining of a brake band according to a second embodiment of this invention.
Figure 17:
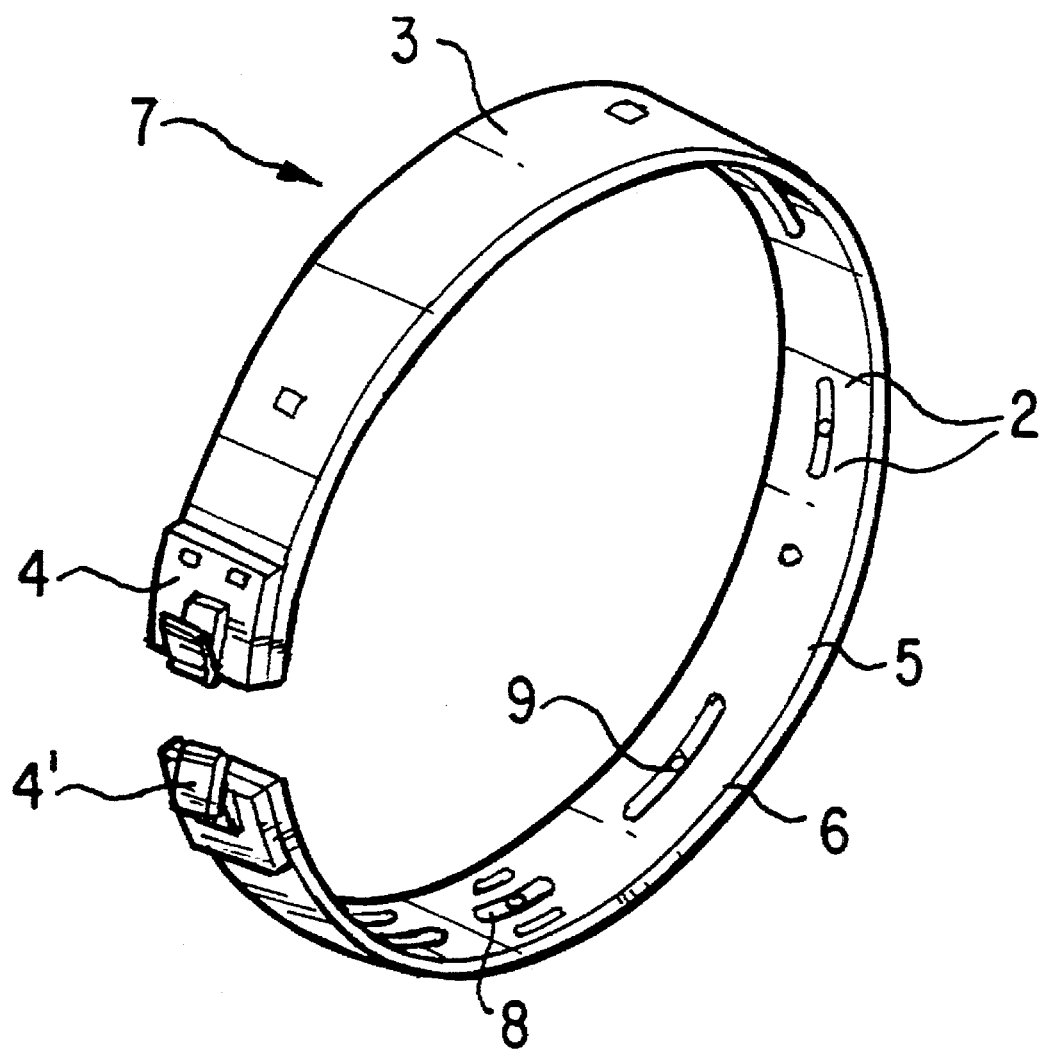
FIG. 17 illustrates a brake band having a brake lining according to FIG. 2.

In the second embodiment illustrated in FIG. 2, oil grooves 8 are arranged in a single row. In the vicinity of the right-hand end, i.e., the anchor side end, however, there is an oil groove 80 which is not provided with any oil discharging aperture and serves as an oil reservoir. FIG. 17 illustrate the brake lining of FIG. 2 bonded to a brake band.

Figure 3:
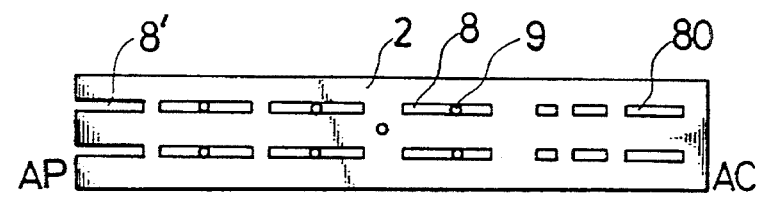
FIG. 3 is a development of a brake lining of a brake band according to a third embodiment of this invention.

The third embodiment illustrated in FIG. 3 is similar to the first embodiment shown in FIG. 1 but oil grooves are arranged in two rows.

Figure 4:
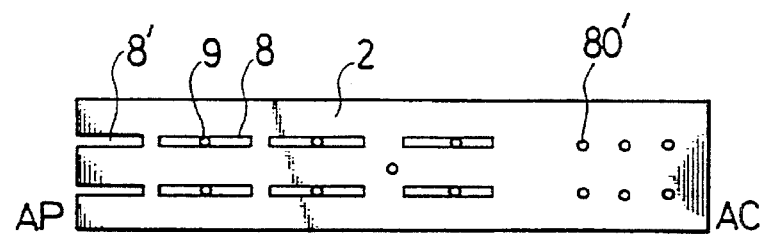
FIG. 4 is a development of a brake lining of a brake band according to a fourth embodiment of this invention.

The fourth embodiment shown in FIG. 4 is similar to the third embodiment depicted in FIG. 3 and at the right-hand anchor side end, oil apertures 80' not extending to a back side, i.e., an outer peripheral surface of the brake lining are provided so that the oil apertures serve as oil reservoirs.

Figure 5:
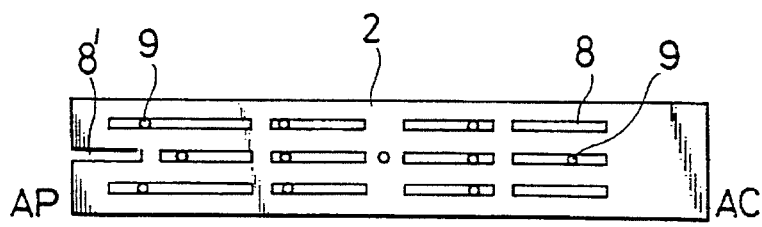
FIG. 5 is a development of a brake lining of a brake band according to a fifth embodiment of this invention.

The fifth embodiment depicted in FIG. 5 is similar to the first embodiment shown in FIG. 1. On the side of the right-hand end, that is, the anchor end side, fewer oil groove(s) are provided with an oil discharging hole 9 and oil grooves are omitted in the vicinity of the anchor side end. No oil discharging means is therefore provided there.

Figure 6:
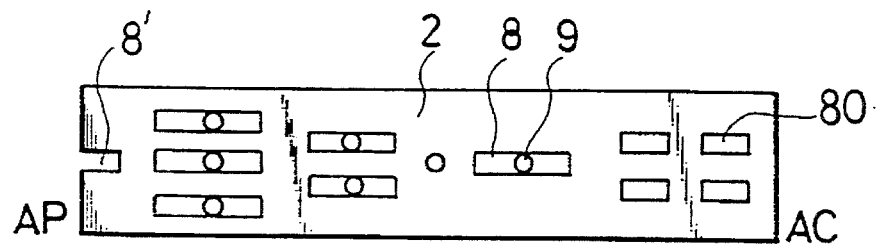
FIG. 6 is development of a brake lining of a brake band according to a sixth embodiment of this invention.
Figure 7:
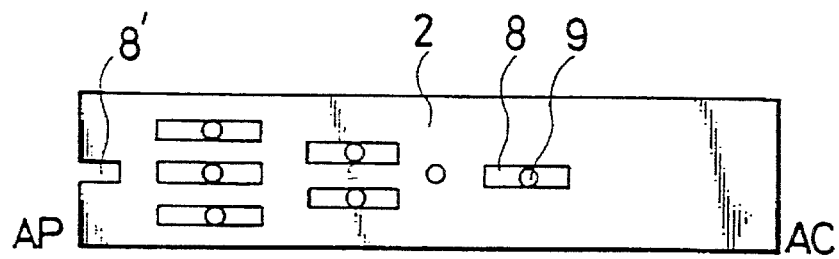
FIG. 7 is a development of a brake lining of a brake band according to a seventh embodiment of this invention.

In each of the sixth and seventh embodiments shown in FIGS. 6 and 7, respectively, the number of the oil discharging grooves decreases substantially in reverse proportion to surface pressure from the apply side end to the anchor side end.

Owing to the construction described above, each brake band according to the present invention can promptly discharge oil on the apply side where the surface pressure upon braking is small and the formation of an oil film is promoted on the anchor side where the surface pressure is large. Accordingly, the torque can be substantially leveled off.

Figure 8:
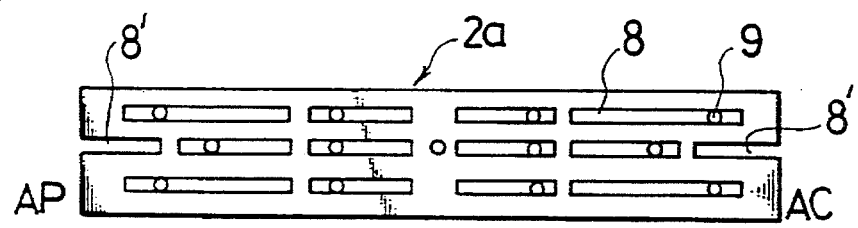
FIG. 8 is a development of one example of conventional brake linings.
Figure 9:
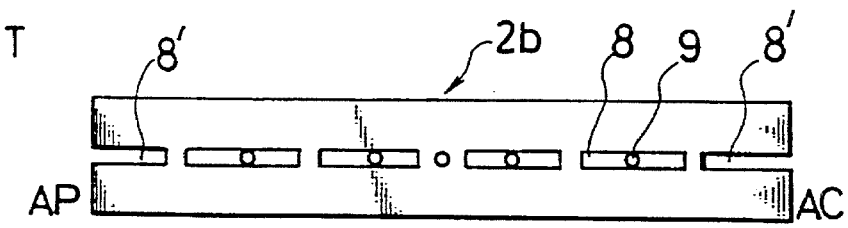
FIG. 9 is a development of another example of the conventional brake linings.
Figure 10:
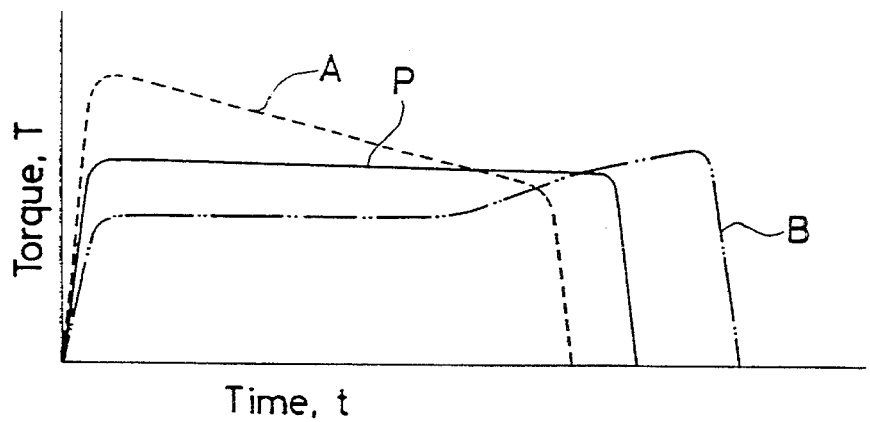
FIG. 10 diagrammatically compares a torque curve of the brake lining of the brake band according to the first embodiment of this invention shown in FIG. 1 with those of the conventional brake linings shown in FIGS. 8 and 9.
Figure 11:
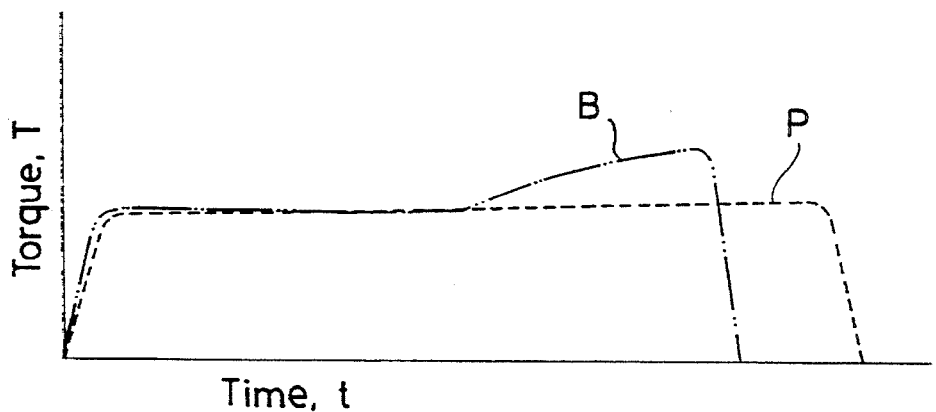
FIG. 11 diagrammatically compares a torque curve of the brake lining of the brake band according to the second embodiment of this invention depicted in FIG. 2 with the torque curve of the conventional brake lining illustrated in FIG. 9.
Figure 12:
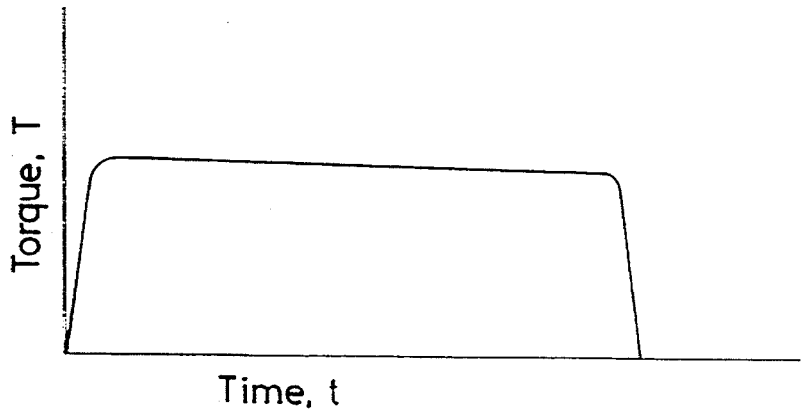
FIG. 12 is a torque curve of a conventional brake lining at the beginning of its use.
Figure 13:
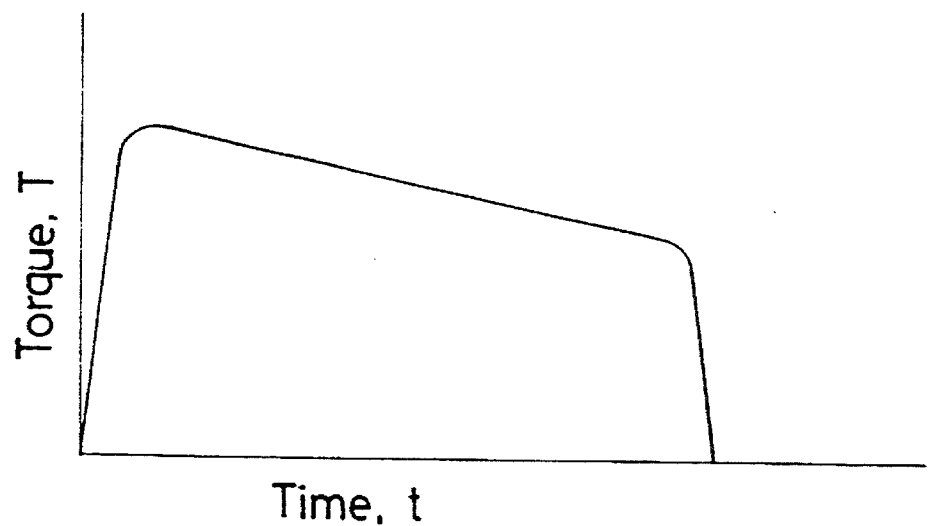
FIG. 13 is a torque-curve of the same conventional brake lining in the middle of its use.
Figure 14:
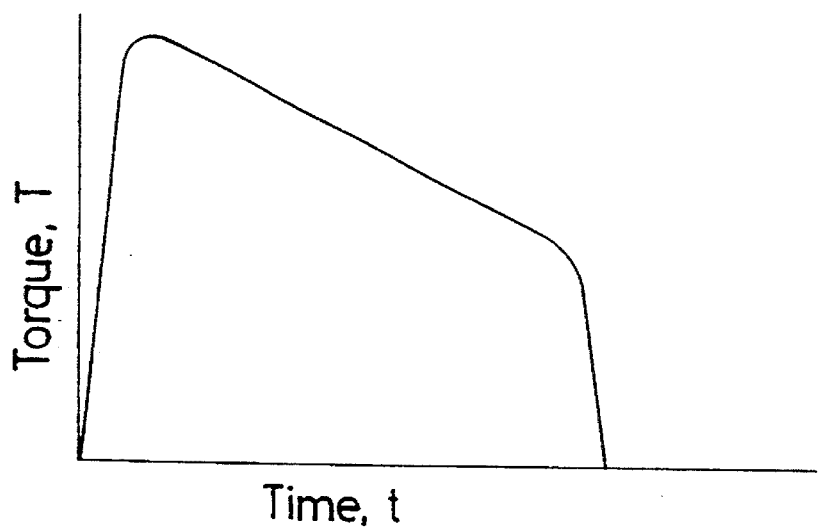
FIG. 14 is a torque curve of the same conventional brake lining at the end of its use.
Figure 15:
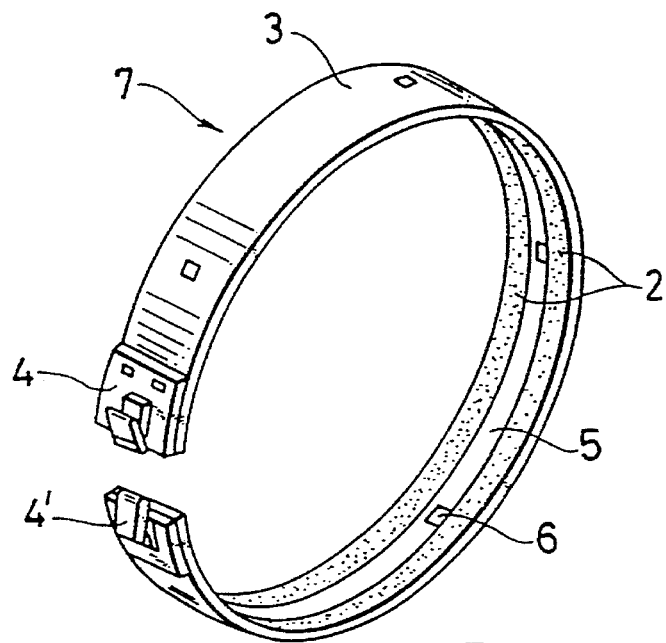
FIG. 15 illustrates the basic construction of a brake band.
Figure 16:
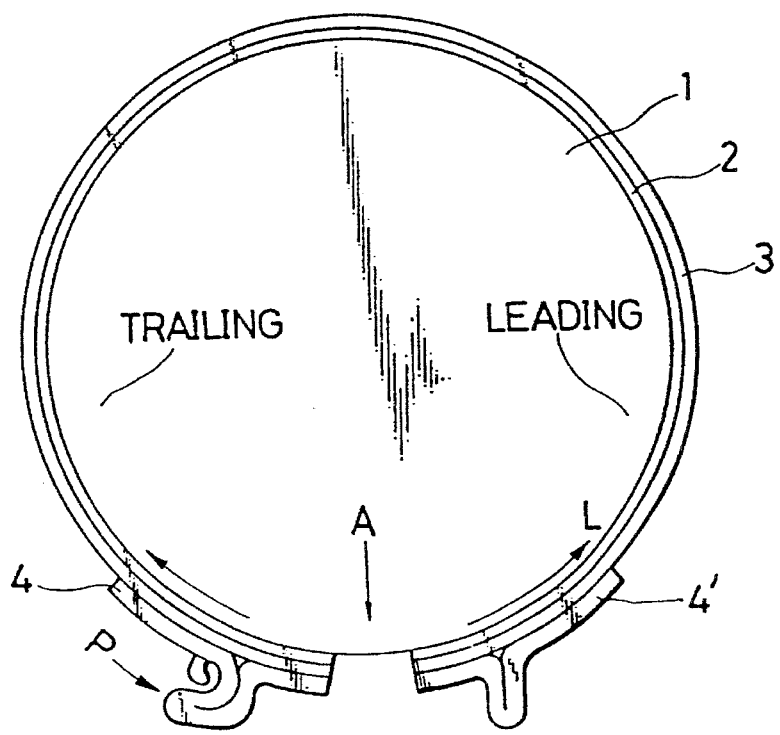
FIG. 16 illustrates the action of the brake band.

In FIGS. 10 and 11, torques T and time t are plotted along an axis of ordinates and an axis of abscissas, respectively. Changes in torque will now be compared. In FIG. 10, a dashed line A indicates a torque curve of the conventional brake lining shown in FIG. 8, a two-dot chain line B a torque curve of the conventional brake lining depicted in FIG. 9, and a solid line P a torque curve of the brake lining according to the first embodiment of this invention. In the case of the dashed line A, oil is discharged promptly so that the starting friction torque is large and a shift shock is hence felt. In the case of the two-dot chain line B, the discharge of oil is not sufficient at the beginning so that the torque is small at the beginning of binding and increases toward the end of the binding. In the case of the solid line P corresponding to the first embodiment of this invention shown in FIG. 1, the torque is leveled off in magnitude.

In FIG. 11, a two-dot chain line B indicating a torque curve of the conventional brake lining shown in FIG. 9 is compared with a dashed line P representing a torque curve of the second embodiment of this invention illustrated in FIG. 2. Here again, the torque curve P is more leveled off than the torque curve B.

What is claimed is:

1. A brake band suitable for use in a vehicle transmission, said brake band comprising a band portion and a brake lining bonded at an outer peripheral surface thereof on an inner peripheral surface of said band portion and having an apply side end and an anchor side end located opposite to each other relative to a circumferential length of said brake band, the improvement wherein said brake lining is provided with oil dependent, friction surface cooling means and oil discharging means and, adjacent to said anchor side end of said brake band, with means for promoting the formation of an oil film, and further wherein said friction surface cooling means and said means for promoting are arranged asymmetrically relative to a central line through said brake lining transverse to a longitudinal central axis of said brake lining;

wherein said means for promoting is an oil reservoir formed of at least one oil recess without any oil discharging means arranged in said brake lining in the vicinity of said anchor side end.

2. A brake band according to claim 1, wherein said oil recess is in the form of a groove not extending to said outer peripheral surface of said brake lining.

3. A brake band according to claim 1, wherein said oil recess is in the form of an aperture not extending to said outer peripheral surface of said brake lining.

4. A brake band suitable for use in a vehicle transmission, said brake band comprising a band portion and a brake lining bonded at an outer peripheral surface thereof on an inner peripheral surface of said band portion and having an apply side end and an anchor side end located opposite to each other relative to a circumferential length of said brake band, the improvement wherein said brake lining is provided with oil dependent, friction surface cooling means and oil discharging means and, adjacent to said anchor side end of said brake band, with means for promoting the formation of an oil film, and further wherein said friction surface cooling means and said means for promoting are arranged asymmetrically relative to a central line through said brake lining transverse to a longitudinal central axis of said brake lining;

wherein said means for promoting is free of any recess in the vicinity of said anchor side end so that the formation of an oil film is facilitated there.

5. A brake band according to claim 1, wherein said friction surface cooling means comprises oil grooves formed in said brake lining without extending to said outer peripheral surface, whereby said oil grooves have bottom walls, respectively, said oil discharging means comprises oil discharging apertures formed through said bottom walls of said oil grooves, respectively, and the total cross-sectional area of said oil grooves per unit area of said brake lining decreases from said apply side end toward said anchor side end.

6. A brake band according to claim 5, wherein said oil grooves have substantially the same cross-sectional area and the number of said oil grooves per unit area becomes smaller from said apply side end toward said anchor side end.

7. A brake band according to claim 1, wherein said brake lining has at least one groove extending to said outer peripheral surface of said brake lining and communicating to an exterior through said apply side end.

8. A brake lining for a brake band suitable for use in a vehicle transmission and having a band portion, having an outer peripheral surface and having an apply side end and an anchor side end located opposite to each other relative to a circumferential length of said brake band, the improvement wherein said brake lining is provided with oil dependent, friction surface-cooling means and oil discharging means and, adjacent to said anchor side end of said brake lining, with means for promoting the formation of an oil film, and further wherein said friction surface cooling means and said means for promoting are arranged asymmetrically relative to a central line through said brake lining transverse to a longitudinal central axis of said brake lining;

wherein said means for promoting is an oil reservoir formed of at least one oil recess without any oil discharging means arranged in said brake lining in the vicinity of said anchor side end.

9. A brake lining according to claim 8, wherein said oil recess is in the form of a groove not extending to said outer peripheral surface of said brake lining.

10. A brake lining according to claim 8, wherein said oil recess is in the form of an aperture not extending to said outer peripheral surface of said brake lining.

11. A brake lining for a brake band suitable for use in a vehicle transmission and having a band portion, having an outer peripheral surface and having an apply side end and an anchor side end located opposite to each other relative to a circumferential length of said brake band, the improvement wherein said brake lining is provided with oil dependent, friction surface cooling means and oil discharging means and, adjacent to said anchor side end of said brake lining, with means for promoting the formation of an oil film, and further wherein said friction surface cooling means and said means for promoting are arranged asymmetrically relative to a central line through said brake lining transverse to a longitudinal central axis of said brake lining;

wherein said means for promoting keeps said brake lining free of any recess in the vicinity of said anchor side end so that the formation of an oil film is facilitated there.

12. A brake lining according to claim 8, wherein said friction surface cooling means comprises oil grooves formed in said brake lining without extending to said outer peripheral surface, whereby said oil grooves have bottom walls, respectively, said oil discharging means comprises oil discharging apertures formed through said bottom walls of said oil grooves, respectively, and the total cross-sectional area of said oil grooves per unit area of said brake lining decreases from said apply side end toward said anchor side end.

13. A brake lining according to claim 12, wherein said oil grooves have substantially the same cross-sectional area and the number of said oil grooves per unit area becomes smaller from said apply side end toward said anchor side end.

14. A brake lining according to claim 8, wherein said brake lining has at least on groove extending to said outer peripheral surface of said brake lining and communicating to an exterior through said apply side end.

* * * * *